2,878,107
ENGINE EXHAUST GAS TREATMENT APPARATUS

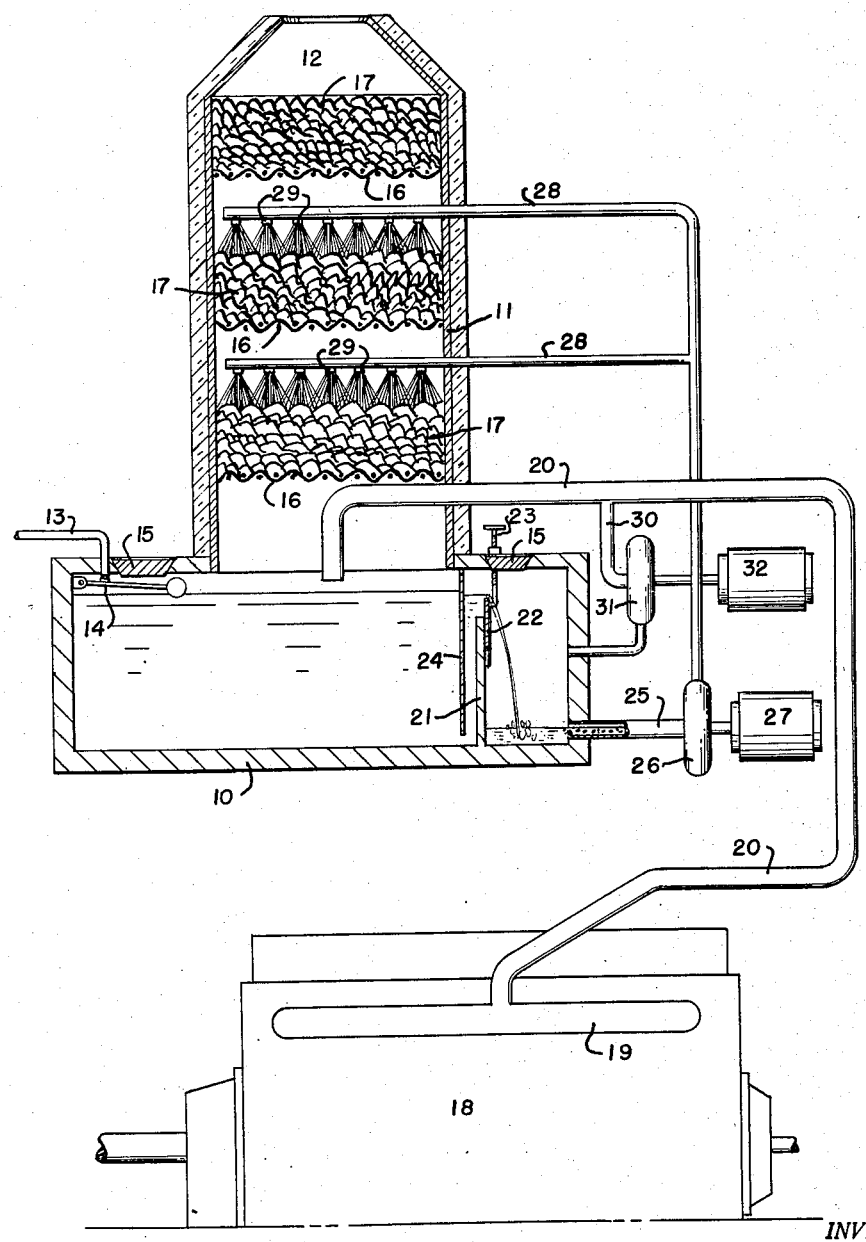

Joseph P. Ruth, Denver, Colo.

Application September 6, 1955, Serial No. 532,711

2 Claims. (Cl. 23—283)

This invention relates to methods and means for the treatment of internal combustion engine exhaust gases, and particularly the exhaust gases from diesel-type engines, to condition the same for discharge to atmosphere free from inimical and undesirable properties, and has as an object to provide a novel and improved exhaust gas conditioner characterized by an improved operative method primarily adapted for association with and to effectively treat the exhaust gas output from fixed engine installations characteristic of power-generating plants, pumping stations, and the like.

A further object of the invention is to provide a novel and improved exhaust gas conditioner continuously operable to efficiently treat the exhaust gas output from fixed engine installations through long periods of time with minimum occasion for attention and maintenance.

A further object of the invention is to provide a novel and improved exhaust gas conditioner for fixed engine installations that is operable to efficiently treat and purify the exhaust gas output of the associated engine without imposition of adverse back pressures.

A further object of the invention is to provide a novel and improved exhaust gas conditioner for fixed engine installations that is characterized by novel means for effecting a gas-water mixture and applying the same to enhance efficient performance of the conditioner.

A further object of the invention is to provide a novel and improved exhaust gas conditioner for fixed engine installations that is relatively simple and inexpensive of construction, largely automatic in operation, susceptible of ready adjustment to meet variations of operational requirements, and positive and efficient in attainment of the ends for which designed.

With the foregoing and other objects in view, my invention consists in the construction, arrangement, and operative combination of elements as hereinafter set forth, pointed out in my claims, and illustrated by the accompanying drawing, in which—

The single view of the drawing is a schematic representation of a conditioner typically embodying the principles of the invention as operatively associated with an engine, the conditioner being shown in vertical section.

It has been established that the exhaust gases from internal combustion engines, including those from diesel-type engines, may be cooled and freed of their noxious, inimical and undesirable properties to condition the same for discharge to atmosphere without hazard to animal or plant life and without any objectionable qualities by passing the gases through a diffusing bed, or beds, of alkaline material, such as broken limerock, maintained wetted and washed by a gas-water mixture, or equivalent solution, having a natural acid characteristic reactive with the material of the diffusing bed, or beds. The extensive use of large, fixed engine installations discharging their untreated exhaust fumes to atmosphere aggravates a problem of air pollution requiring correction, hence the instant invention is directed to the provision of an efficient and practical conditioner unit through which the exhaust gas output from fixed engines, of whatever capacity, may be subjected to the ameliorative and purifying treatment above outlined.

In any appropriate particular construction, the conditioner unit includes a tank 10 adapted to confine a charge of water and a tower 11 upstanding from and in full communication at its lower end through the otherwise closed top of said tank to terminate in a preferably-restricted upper end 12 opening to atmosphere. A water supply line 13 serves the tank 10 through a float-controlled valve 14 in a usual manner effective to automatically maintain within the tank a charge of water at a substantially uniform level spacedly subjacent the tank top closure. To facilitate access to the interior of the tank 10, ports normally closed by removable members 15 may be provided in the tank top closure.

Suitably supported to bridge transversely within and spaced apart altitudinally of the tower 11, a succession of reticulate or foraminous baffles 16, in this instance three in number, each supports a permeable charge 17 of alkaline material, such as broken limerock, constituting a diffusing bed transversely obstructing the tower interior; said beds being of substantial depth with the upper surfaces of the lower charges 17 spaced well below the superjacent baffle 16 to provide zones within the tower wherein gases uprising through the lower charges 17 may expand before traversing the superjacent charge. The exhaust gas output from the associated engine 18 is collected in the usual engine manifold 19 and directed thence through an exhaust gas flow line 20 sealed through a wall and adjacent the base of the tower 11 to delivery centrally of the tower base downwardly against, or feasibly below, the surface of the water charge confined by the tank 10, whence said gases expand in an obvious manner and in contact with water vapor in the base of the tower to uprise with successive expansions through the baffles 16 and their charges 17 to ultimate exhaust to atmosphere through the opening in the upper end 12 of the tower. Manifestly, as the gases traverse the charges 17 they are repetitiously scrubbed and diffused in intimate contact with the surfaces of the alkaline material composing the charges, solids entrained by the gases are entrapped, and the gases are cooled and dewatered with gravity return of solids, condensate, and drip to the tank 10.

While delivery of the exhaust gases below the surface of the water charge within the tank 10 might be availed of for generation of a gas-water mixture reactive with the alkaline material of the charges 17 and for entrainment of water and water vapor with wetting and washing effect upon the material of said charges, efficient operation of the conditioner is so dependent upon postive and adequate washing and wetting of said charges with a gas-water mixture as to warrant the provision of independent means dependably operable to effect such function. Accordingly, a partition 21 is arranged to upstand from the bottom, across, and inwardly adjacent one end of the tank 10 to divide the latter into a major compartment underlying the tower 11 and a lesser end compartment. The partition 21 terminates in a horizontal upper margin spaced well below the tank top closure and hence below the normal level of the water charge confined by the tank 10, and a weir 22 is slidably associated with and for altitudinal adjustment, as by means 23, relative to the upper portion of the partition 21 to serve as the selectively and altitudinally adjustable overflow lip between the two compartments of the tank. Facilitating precise and positive regulation of overflow across the lip provided by the weir 22, a baffle 24 depends from the tank top closure in spaced relation inwardly of the tank from and parallel to the partition 21 to close entirely across the tank with its lower margin spaced upwardly from the bottom of the tank, whereby to provide a well between said partition 21 and baffle 24 through which water from the major compartment of the tank may uprise to overflow the lip of the weir 22. From and adjacent the floor of the end compartment of the tank 10 defined by the partition 21, a flow line 25 leads through a pump 26 in driven relation with a motor 27, or functionally-equivalent supply of power, to like branches 28 sealed through the wall of the tower 11 between the adjacent charges 17 therein and arranged interiorly of the tower for discharge, as through jets 29, to the upper surface of the charge 17 therebeneath. With water in adequate amount present in the end compartment of the tank 10, the system comprised by the line 25, pump 26, branches 28, and jets 29 is effective when said pump is operated to deliver water from said end compartment as spray to and with washing and wetting effect upon the material of the charges 17 underlying said branches. For the introduction of gas to the water delivered by the jets 29, and the consequent generation of a gas-water mixture reactive with the material of the charges 17, a branch 30 from the exhaust flow line 20 leads through a pump 31 in driven relation with a motor 32, or functionally-equivalent supply of power, to delivery within the end compartment of the tank 10, from whence, by virtue of the seal provided by the baffle 24, there is no outlet for the gas save through the line 25.

With exhaust gas flow in the line 20, a full charge of water in the tank 10, and the pumps 26 and 31 operating, simple adjustment of the weir 22 is all that is necessary for positive and efficient functioning of the unit as an exhaust gas conditioner. The weir 22 is adjusted under the pressure differential obtaining in the two compartments of the tank 10 to permit such flow of water thereover and into the end compartment of the tank as will somewhat less than satisfy the intake induced through the line 25 by the pump 26, whereby the gas introduced under some pressure to said end compartment by the pump 31 is constrained to enter the line 25 with the limited supply of water and thoroughly and intimately admix therewith as both pass through the pump 26, branches 28, and jets 29. As a consequence of the arrangement shown and described, the jets 29 deliver to the charge 17 therebeneath a gas-water mixture effective to wash, wet, and react with the material of said charges in a manner to maintain such material in condition for desired treatment and purification of the gases uprising therethrough from the delivery end of the line 20.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In apparatus for the treatment of exhaust gases from internal combustion engines having a tank adapted to confine a constant-level charge of water, a tower open to atmosphere at its upper end upstanding from said tank, a flow line disposed for the delivery of exhaust gases at discharge pressures within the base of said tower for buoyant uprise at diminishing pressure therethrough, and diffusing beds of intersticed alkaline material spaced apart in said tower across the path of gas uprise therein, means for continuously washing at least one of said beds with acidified water mildly reactive therewith, said means comprising a water supply line delivering to said tank through flow-regulating means effective to maintain therein a constant-level water charge, an extension of said tank laterally beyond the tower closed save for its communicating connection with the tank, an adjustable weir transversely of said extension adjacent its connection with the tank determinative of regulable overflow from said tank and to the interior of said extension, a baffle spacedly paralleling the tank side of said weir and defining therewith an overflow trap closing the interior of the extension to atmosphere, a by-pass from said flow line through a pump to said tank extension for pressure delivery of a diverted portion of exhaust gas flow therewithin, and a separate flow line from said extension through a pump arranged for spray delivery of gas-water mixtures generated interiorly of the extension over and upon a diffusing bed upper surface.

2. In apparatus for the treatment of exhaust gases from internal combustion engines having a tank adapted to confine a constant-level charge of water, a tower open to atmosphere at its upper end upstanding from said tank, a flow line disposed for the delivery of exhaust gases at discharge pressures within the base of said tower for buoyant uprise at diminishing pressure therethrough, and diffusing beds of intersticed alkaline material spaced apart in said tower in the path of gas uprise therein, means for continuously washing at least one of said beds with acidified water mildly reactive therewith, said means comprising a water supply line delivering to said tank through flow-regulating means effective to maintain therein a constant-level water charge, an extension of said tank laterally beyond the tower closed save for its communicating connection with the tank, spacedly-parallel adjustable-weir and baffle means transversely of said extension adjacent its connection with the tank closing said extension to atmosphere as a trap accommodative of regulable overflow from said tank to the interior of the extension, a by-pass from said flow line through a pump to said closed tank extension for pressure delivery of a diverted portion of exhaust gas flow in exposure to water overflow from the tank therewithin, whereby to generate mildly acidic gas-water mixtures, and a separate flow line from said extension through a pump arranged for spray delivery of the so-acidified mixtures over and upon a diffusing bed upper surface.

References Cited in the file of this patent

UNITED STATES PATENTS

| Number | Name | Date |
| --- | --- | --- |
| 996,205 | Bregha | July 27, 1911 |
| 2,147,161 | Haglund | Feb. 14, 1939 |
| 2,585,638 | Drew | Feb. 12, 1952 |
| 2,611,680 | Ruth | Sept. 23, 1952 |

OTHER REFERENCES

"The Mechanics and Chemistry of Diesel Exhaust Gas Conditioning," publication of the Ruth Co., Denver 2, Colo., Apr. 23, 1952.